Oct. 12, 1937.　　M. F. BRAZ, SR　　2,095,913
EGG SLICER
Filed Dec. 2, 1936　　2 Sheets-Sheet 1

Inventor
Manuel F. Braz, Sr.

By Clarence A. O'Brien and
Hyman Berman
Attorneys

Oct. 12, 1937.   M. F. BRAZ, SR   2,095,913
EGG SLICER
Filed Dec. 2, 1936   2 Sheets-Sheet 2
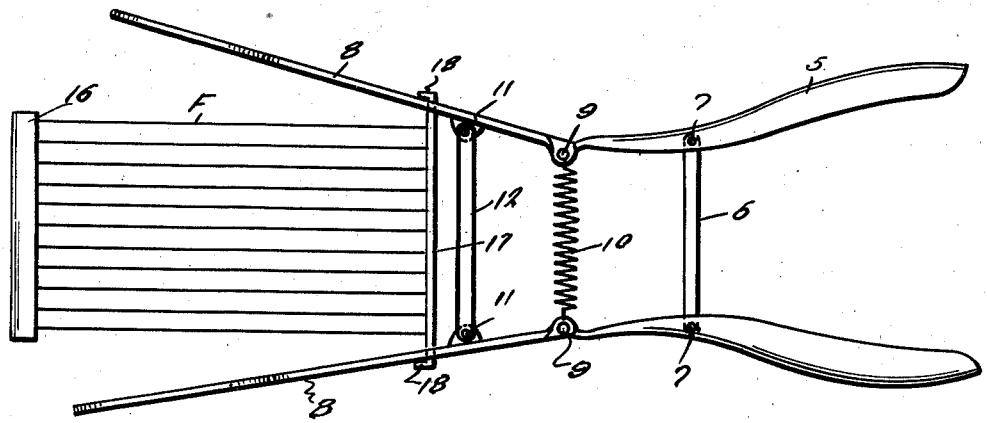
Fig. 3.
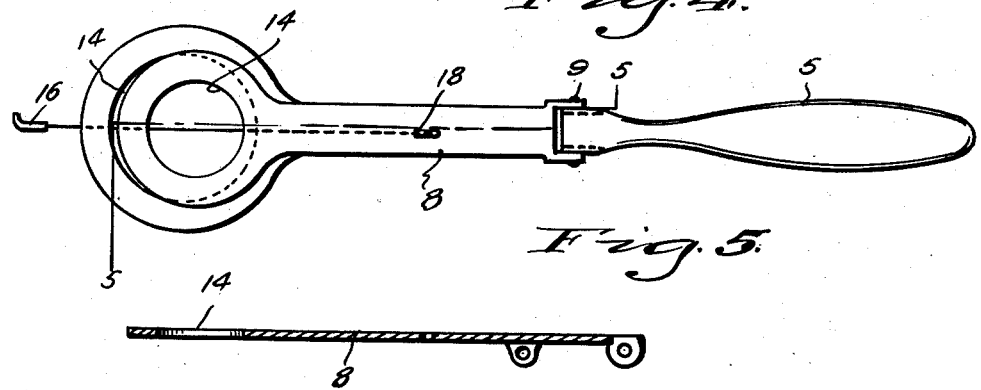
Fig. 4.
Fig. 5.
Fig. 6.
Inventor
Manuel F. Braz, Sr.
By Clarence A. O'Brien and
Hyman Berman
Attorneys Patented Oct. 12, 1937

2,095,913

UNITED STATES PATENT OFFICE 2,095,913

EGG SLICER

Manuel Freitas Braz, Sr., Hilo, Territory of Hawaii

Application December 2, 1936, Serial No. 113,916

1 Claim. (Cl. 146—147)

The present invention relates to an egg slicer and the object of the invention resides in the provision in providing means whereby an egg may be sliced evenly in a single operation.

Another important object of the invention resides in the provision of an egg slicer of this nature which is simple in its construction, inexpensive to construct, easy to manipulate, thoroughly efficient and reliable in use and operation and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 4 is a side elevation thereof.

Figure 5 is a detail sectional view taken substantially on the line 5—5 of Figure 4.

Figure 6 is a detail sectional view taken through one of the handles.

Figure 7 is a perspective view of the frame.

Figure 1:
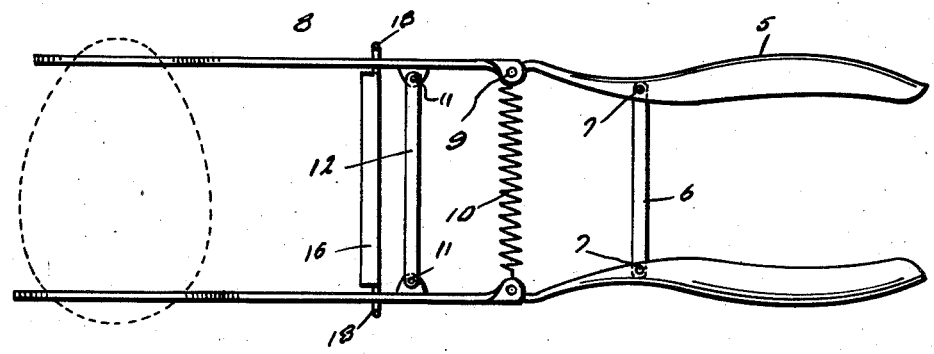
Figure 1 is a plan view of a slicer embodying the features of my invention.
Figure 2:
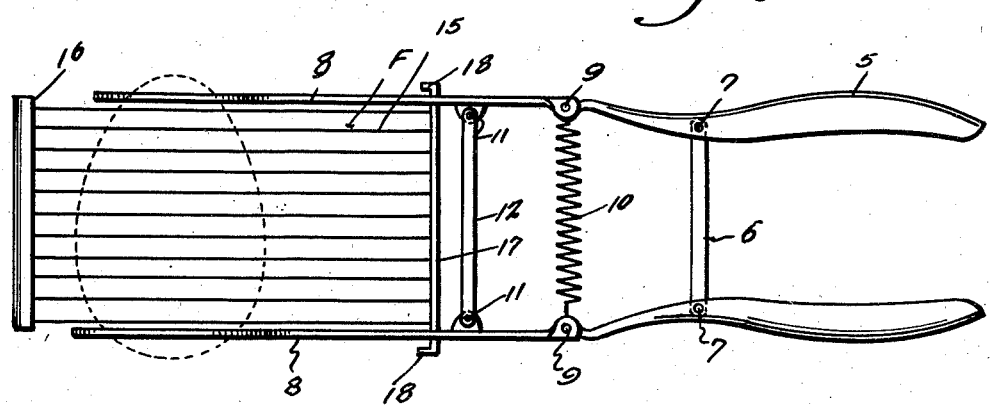
Figure 2 is a similar view showing a slicing attachment incorporated therein.
Figure 3:
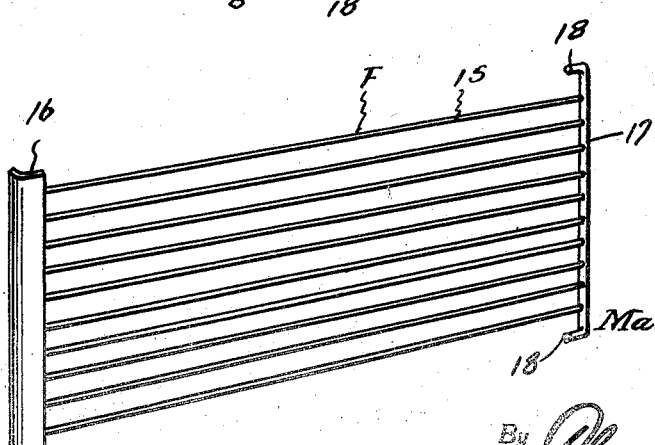
Figure 3 is a similar view showing the attachment incorporated therein with the jaws in an open position.

Referring to the drawings in detail it will be seen that the numerals 5 denote a pair of handles connected together by a link 6 pivoted at 7 to the handle. Numerals 8 denote jaws pivotally connected as at 9 with the handles and having a spring 10 associated therewith at this point. These handles 7 are pivotally connected as at 11 with the link 12. The jaws 8 are provided with openings 14, one of the openings being larger than the other so as to receive the larger end of the egg as indicated in dotted line in Figure 1.

A frame F comprises a plurality of spaced parallel members 15 the outer ends of which are connected with the bar 16 and the inner ends of which are connected with the rod 17 and the ends of the rod are provided with lugs 18. The rod 17 is adapted to extend through slots in the jaws 8 and when an egg is held in between the jaws 8 by the spring 12 the frame F may be swung so that the rods or tines or cutters 15 sever the egg into slices.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

An egg cutter of the class described comprising a pair of handles, a link pivotally connecting the handles, a pair of jaws pivotally connected with the handles, a link pivotally connecting the jaws intermediate their ends, a spring connected with the pivotal connection of the handles with the jaws, the jaws having openings therein, a frame including cutter rods, a rod connected with the ends of the cutter rods and extending through openings in the jaws.

MANUEL FREITAS BRAZ, Sr.